(12) United States Patent
Schwindeman et al.

(10) Patent No.: US 6,184,309 B1
(45) Date of Patent: Feb. 6, 2001

(54) SELECTED DEPROTECTION OF PROTECTED FUNCTIONAL POLYMERS

(75) Inventors: James A. Schwindeman, Lincolnton; John F. Engel, Belmont; Eric J. Granger, Charlotte; Conrad W. Kamienski, Gastonia, all of NC (US); Roderic P. Quirk, Akron, OH (US)

(73) Assignee: FMC Corporation, Philadelphia, PA (US)

(*) Notice: Under 35 U.S.C. 154(b), the term of this patent shall be extended for 0 days.

(21) Appl. No.: 09/207,226

(22) Filed: Dec. 8, 1998

Related U.S. Application Data

(62) Division of application No. 08/679,291, filed on Jul. 12, 1996, now Pat. No. 5,922,810.
(60) Provisional application No. 60/001,692, filed on Jul. 31, 1995.

(51) Int. Cl.$^7$ ...................................................... C08F 8/00
(52) U.S. Cl. .................. 525/355; 525/358.1; 525/359.4; 525/342; 525/353
(58) Field of Search ................................ 525/355, 359.1, 525/359.4, 342, 353

(56) References Cited

U.S. PATENT DOCUMENTS

| | | |
|---|---|---|
| 3,280,084 | 10/1966 | Zelinski et al. . |
| 3,326,881 | 6/1967 | Uraneck et al. . |
| 3,639,517 | 2/1972 | Kitchen et al. . |
| 3,776,964 | 12/1973 | Morrison et al. . |
| 3,842,146 | 10/1974 | Milkovich et al. . |
| 3,862,100 | 1/1975 | Halasa et al. . |
| 3,954,894 | 5/1976 | Kamienski et al. . |
| 3,985,830 | 10/1976 | Fetters et al. . |
| 4,015,061 | 3/1977 | Schulz . |
| 4,039,593 | 8/1977 | Kamienski et al. . |
| 4,491,628 | * 1/1985 | Ito ........................................ 430/176 |
| 4,994,526 | 2/1991 | Peters . |
| 5,310,490 | 5/1994 | Struglinski et al. . |
| 5,310,814 | 5/1994 | Struglinski et al. . |
| 5,331,058 | 7/1994 | Shepherd et al. . |
| 5,336,726 | 8/1994 | DuBois . |
| 5,362,699 | 11/1994 | Shepherd et al. . |
| 5,376,745 | 12/1994 | Handlin, Jr. et al. . |
| 5,391,663 | 2/1995 | Bening et al. . |
| 5,393,843 | 2/1995 | Handlin, Jr. et al. . |
| 5,416,168 | 5/1995 | Willis et al. . |
| 5,478,899 | 12/1995 | Bening . |
| 5,486,568 | 1/1996 | Bening et al. . |

FOREIGN PATENT DOCUMENTS

| | | |
|---|---|---|
| 43 33 682 | 4/1995 | (DE) . |
| 0 096 459 | 12/1983 | (EP) . |
| 0 295 076 | 12/1988 | (EP) . |
| 0 363 990 | 4/1990 | (EP) . |
| 0 593 049 | 4/1994 | (EP) . |
| 0 632 075 | 1/1995 | (EP) . |
| 2 434 822 | 3/1980 | (FR) . |
| 2 241 239 | 8/1991 | (GB) . |
| 2 270 317 | 3/1994 | (GB) . |
| 91/12277 | 8/1991 | (WO) . |

OTHER PUBLICATIONS

D.N. Schulz et al., J. Poly. Sci. Polymer Chem. Ed. 12, 153–166 (1974).
M. Gardette et al.., Tetrahedron 41, 5887–5899 (1985).
J. Almena, Tetrahedron 51, 11883–11890 (1995).
T.W. Greene and P.G.M. Wuts, Protective Groups in Organic Synthesis (John Wiley & Sons, Inc., New York 1991) pp. 41–42.
T.W. Greene and P.G.M. Wuts, Protective Groups in Organic Synthesis (John Wiley & Sons, Inc., New York 1991) pp. 80–83.
X. Franck et al. Tetrahedron Letters 36, 711–714 (1995).
M. Jung et al., J. Org. Chem. 42, 3761–3764 (1977).

* cited by examiner

Primary Examiner—Christopher Henderson
(74) Attorney, Agent, or Firm—Alston & Bird LLP

(57) ABSTRACT

A process for removing a protecting group from a polymer. Protected functional groups of a polymer may be deprotected by treating the polymer in the presence of an acid catalyst, including organic acids, mineral acids, heterogeneous acid systems, Lewis acids, and fluoride ion sources.

25 Claims, No Drawings

SELECTED DEPROTECTION OF PROTECTED FUNCTIONAL POLYMERS

CROSS-REFERENCE TO RELATED APPLICATIONS

This application is a divisional of application Ser. No. 08/679,291, filed Jul. 12, 1996, now U.S. Pat. No. 5,922,810, which is related to commonly owned Provisional Application Serial No. 60/001,692, now abandoned filed Jul. 31, 1995, and claims the benefit of its earlier filing date under 35 U.S.C. 119(e).

FIELD OF THE INVENTION

The present invention relates to processes for removing protecting groups from protected functionalized polymers.

BACKGROUND OF THE INVENTION

Mono- and di-functional polymers (i.e., telechelic polymers that contain two functional groups per molecule at the termini of the polymer) have found wide utility in many applications. For instance, telechelic polymers have been employed as rocket fuel binders, in coatings and sealants and in adhesives. In addition, polymers that contain two hydroxyl groups per molecule can be co-polymerized with appropriate materials to form polyesters, polycarbonates, and polyamides (see U.S. Pat. No. 4,994,526).

A variety of polymerization techniques, such as cationic and free radical polymerizations, have been employed to prepare functional polymers. However, functionality can be best controlled with anionic polymerization. Living anionic polymerization of styrene and diene monomers were first described by Szwarc and his coworkers. See M. Szwarc, *Nature* 178, 1169 (1956) and M. Szwarc, et al., *J.Am.Chem..Soc.* 78, 2656 (1956).

Various publications have discussed the use of protected functional initiators to provide telechelic polymers. An early approach to the preparation of telechelic polymers is discussed in D. N. Schulz, et al., *J.Polym.Sci., Polym.Chem.Ed.* 12, 153 (1974), which describes the reaction of a protected hydroxy initiator with butadiene. The resultant living anion was quenched with ethylene oxide to afford mono-protected di-hydroxy polybutadiene. While excellent functionality (f=1.87–2.02) was achieved by this process, the protected initiator was insoluble in hydrocarbon solution. Therefore, the reaction was conducted in diethyl ether, and as a result, relatively high 1,2 microstructure (31–54%) was obtained.

U.S. Pat. Nos. 5,331,058 and 5,362,699 to Shepherd, et al. discuss the preparation of telechelic polymers in hydrocarbon solutions using monofunctional silyl ether initiators. These monofunctional silyl ether initiators can be useful in producing dihydroxy (telechelic) polybutadienes having desirable characteristics, such as a molecular weight of typically 1,000 to 10,000, a 1,4 microstructure content of typically 90%, and the like.

These and other anionic polymerization techniques, and in particular those using protected functional initiators, can be useful for the preparation of protected functional polymers. However, problems have been encountered in deprotecting or removing the protecting group from functional polymer moieties. Typically, prior deprotecting processes can require the use of costly reagents, result in partial or essentially no cleavage of the protecting group, lack economic feasibility in commercial production (for example, require high temperatures, long reaction times, etc.), alter the polymer structure, and the like.

For example, U.S. Pat. Nos. 5,331,058 and 5,362,699 discuss the use of tetraalkylammonium fluorides in polar solvents as useful desilylation reagents. However, tetraalkylammonium fluoride reagents can be costly and difficult to handle due to their toxicity (see discussion in U.S. Pat. No. 5,376,745). Further, it can be difficult to effectively remove the silyl protecting groups of these types of initiators using tetraalkylammonium fluoride, and other, reagents. Other reagents, such as tert-butyldimethylsilyl triflate, can alter the polymer structure.

SUMMARY OF THE INVENTION

The present invention provides processes for deprotecting functionalized polymers, including mono- and di-functional polymers and functionalized multi-branched or star polymers. In the invention, the protected functionalized polymer is treated in the presence of an acid catalyst under conditions selected to remove at least one protecting group. Exemplary acid catalysts useful in the present invention include organic acids, mineral acids, heterogeneous acid systems, Lewis acids and fluoride ion sources.

The process of the invention is capable of being conducted at a variety of temperatures and processing times, ranging from ambient to about 200° C., and from about one hour to about 24 hours, thus imparting flexibilty to the deprotection process. Further, protected functionalized polymers can be effectively deprotected in accordance with the invention using relatively mild conditions and with minimal or no structural changes in the polymer. The process of the invention can also offer economies of production, including reduced reaction times, temperatures, lower reagent costs, and the like. Still further, deprotection conditions can also be selected to provide selected deprotection of dissimilar protecting groups, or to provide partial deprotection, as desired.

DETAILED DESCRIPTION OF THE INVENTION

The processes of the present invention are useful for deprotecting functionalized polymers, including mono- and di-functional polymers and functionalized multi-branched or star polymers. Polymers which can be deprotected in accordance with the present invention can be represented by the following general formulas:

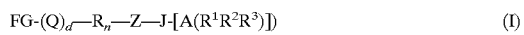  (I)

or

  (II)

wherein FG is H or a protected or non-protected functional group; Q is a saturated or unsaturated hydrocarbyl group derived by incorporation of a compound selected from group consisting of conjugated diene hydrocarbons, alkenylsubstituted aromatic hydrocarbons, polar compounds, and mixtures thereof; d is an integer from 10 to 2000; R is a saturated or unsaturated hydrocarbyl group derived by incorporation of a compound selected from the group consisting of conjugated diene hydrocarbons, alkenylsubstituted aromatic hydrocarbons, and mixtures thereof; n is an integer from 0 to 5; Z is a branched or straight chain hydrocarbon group which contains 3–25 carbon atoms, optionally containing aryl or substituted aryl groups; J is oxygen, sulfur, or nitrogen; $[A(R^1R^2R^3)]_x$ is a protecting group, in which A is an element selected from Group IVa of the Periodic Table of Elements; $R^1$, $R^2$, and $R^3$ are each independently selected from the group consisting of hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen; L in Formula II is a linking or coupling agent, as described below; and m can be an integer from 3 to 50.

In the present invention, a polymer as represented by Formulas (I) or (II) above is treated with an acid catalyst which is suitable for removing or cleaving the protecting group $[A(R^1R^2R^3)]_x$. The process of the invention is particularly useful for the removal of alkyl ether protecting groups wherein J is oxygen and A is carbon, although the invention is not limited to removal of these groups.

The acid catalyst employed in accordance with the invention is generally selected from the group consisting of organic acids (including without limitation para-toluenesulfonic acid, trifluoroacetic acid, acetic acid, methanesulfonic acid, and the like), dilute mineral acids (including without limitation hydrochloric acid, phosphoric acid, sulfuric acid, and the like, having a concentration between about 0.01 N and about 12 N), heterogeneous acid systems (including without limitation acid ion exchange resins, such as Amberlyst® 15, a commercially available polystyrene-based resin with sulfonic acid groups, Dowex® 50, a commercially available polystyrene-based resin from Dow Chemical, Reillex® 425 HCl, a commercially available polyvinyl pyridine-based resin from Reilly Tar and Chemical, acid clays, and the like), Lewis acids (including without limitation trimethylsilyl iodide, iron (III) chloride with acetic anhydride, boron trihalides, such as boron trifluoride, and the like) and suitable sources of fluoride ions, such as tetraalkylammonium fluoride, such as tetrabutylammonium fluoride, potassium fluoride, sodium fluoride, cesium fluoride, lithium fluoride, lithium tetrafluoroborate, hydrogen fluoride, pyridine hydrogen fluoride complex, and the like.

The polymers of Formulas (I) and (II) can be treated under a variety of conditions to deprotect the same. Reaction conditions can vary, depending, for example, on the type of acid catalyst employed, the protecting group to be removed, the degree of deprotection required, the presence of different protecting groups, and the like. Generally, the deprotecting reaction is conducted at a temperature ranging from about ambient (about 20° C.) to about 200° C., although higher or lower temperatures can also be used. Reaction times can also vary, and typically range from about 1 hour to 24 hours, although again higher or lower times can be used. The progress of the deprotection reactions can be monitored by conventional analytical techniques, such as Thin Layer Chromatography (TLC), Nuclear Magnetic Resonance (NMR), or InfraRed (IR) spectroscopy.

For example, organic acids, mineral acids, Lewis acids and fluoride ion sources can generally be used in polar or hydrocarbon solvents, or mixtures thereof, to deprotect the polymers of Formulas (I) and (II) at temperatures ranging from ambient to the reflux temperature of the reaction mixture. The organic acids, mineral acids, Lewis acids, and fluoride ion sources may also be used in excess amounts as solvents in the deprotection process.

Protected functional polymers can be effectively deprotected using heterogeneous acid systems without solvent, for example, by treating the polymer with particles of an acidic ion exchange resin or other heterogeneous acid systems and heat. Alternatively, the protected functional polymer can be deprotected by heating the polymer with a hydrocarbon based two phase solution of the heterogeneous acid system up to the reflux temperature of the reaction mixture. The use of neat acidic ion exchange resins, and other heterogeneous acid systems, can be particularly advantageous in commercial production because of the relative ease and efficiency of use (for example as a fluidized bed of acid catalyst particles, through which the polymer to be deprotected is contacted).

Hydrocarbon solvents useful in practicing this invention include, but are not limited to, inert liquid alkanes, cycloalkanes and aromatic solvents such as alkanes and cycloalkanes containing five to ten carbon atoms, such as pentane, hexane, cyclohexane, methylcyclohexane, heptane, methylcycloheptane, octane, decane and the like, and aromatic solvents containing six to ten carbon atoms such as toluene, ethylbenzene, p-xylene, m-xylene, o-xylene, n-propylbenzene, isopropylbenzene, n-butylbenzene, t-butylbenzene, and the like. Useful polar solvents include, but are not limited to, diethyl ether, dibutyl ether, tetrahydrofuran, 2-methyltetrahydrofuran, methyl tert-butyl ether, diazabicyclo[2.2.2]octane, triethylamine, tributylamine, N,N,N',N'-tetramethylethylene diamine (TMEDA), 1,2-dimethoxyethane (glyme), alkali metal alkoxides and amino-substituted alkali metal alkoxides.

When FG is H, the resultant deprotected polymer is mono-functional, i.e., has a hydroxyl, thio or amino functionality when J is oxygen, sulfur, or nitrogen, respectively. FG can also be a functional group to provide a di-functional polymer. The di-functional polymer may be telechelic, i.e., contain two functional groups which are the same per molecule at the termini of the polymer (FG and J are the same). The polymer can also be hetero-telechelic, having different functionalities at opposite ends of the polymer chain (FG and J are not the same). Further, FG can be protected or non-protected; when FG is protected, the FG protecting group can be the same or different from the $[A(R^1R^2R^3)]_x$ protecting group.

The present invention also provides selective deprotection of functional groups of a polymer or mixtures of polymers. In this regard, deprotecting conditions can be selected to remove at least one protecting group without removing other dissimilar protecting groups, by proper selection of deprotecting reagents and conditions. For example, when polymer (I) includes a protected functional group FG as defined above in addition to protecting group $[A(R^1R^2R^3)]_x$, the polymer of Formula (I) can be treated using the acid catalysts under conditions to selectively remove one or both of the protecting groups. Similarly, a mixture of polymers according to Formulas (I) or (II) having different protecting groups $[A(R^1R^2R^1)]_x$, and/or protecting groups on the functional group FG which are the same or different from the protecting groups $[A(R^1R^2R^3)]_x$, can also be treated using the acid catalysts under conditions to selectively remove one or more of the protecting groups.

The following table details representative experimental conditions capable of selectively removing protecting groups (more labile) while maintaining the integrity of other different protecting groups (more stable).

| Labile | Stable | Conditions |
| --- | --- | --- |
| t-butyldimethylsilyl | t-butyl | tetrabutylammonium fluoride |
| t-butyldimethylsilyl | t-butyl | 1N HCL |

-continued

| Labile | Stable | Conditions |
| --- | --- | --- |
| t-butyldimethylsilyl | dialkylamino | tetrabutylammonium fluoride |
| t-butyldimethylsilyl | dialkylamino | 1N HCL |
| t-butyl | dialkylamino | Amberlyst ® 15 resin |
| t-amyl | dialkylamino | Amberlyst ® 15 resin |
| trimethylsilyl | t-butyl | tetrabutylammonium fluoride |
| trimethylsilyl | t-butyl | 1N HCl |
| trimethylsilyl | dialkylamino | tetrabutylammonium fluoride |
| trimethylsilyl | dialkylamino | 1N HCl |

Still further, the degree or amount of deprotection can also be controlled in accordance with the present invention by suitable selection of deprotecting reaction conditions, acid catalyst, and the like. In this regard, various reaction conditions and/or acid catalysts can be useful to partially deprotect the functional groups. For example, trifluoroacetic acid and trimethylsilyl iodide can be effective in partially deprotecting tertiary alkyl ether protecting groups.

The polymers of Formulas (I) or (II) can be prepared by initiating polymerization of suitable compounds in a polar, hydrocarbon, or mixed hydrocarbon-polar solvent medium with a protected functional organolithium initiator to form an intermediate mono-protected mono-functional living anion. For polar compounds, preferably, the initiator is reacted with an appropriate diphenyl alkyl group, such as 1,1-diphenylethylene, to provide a stabilized carbanion prior to polymerization.

The monomers may be polymerized singly, or in admixture with each other to form tapered or random copolymers, or by charging the compounds to the reaction mixture sequentially, to form block copolymers.

As noted above, the mono-protected mono-functional living anion can be quenched with a suitable proton donor, such as methanol, isopropanol, acetic acid, and the like, to provide a mono-functional polymer (wherein FG is H). Alternatively, polymerization can be followed by functionalization of the resultant living anion with a suitable electrophile to provide a di-functional polymer. The di-functional polymer may be telechelic, i.e., contain two functional groups, which are the same, per molecule at the termini of the polymer. The polymer can also be heterotelechelic, having different functionalities at opposite ends of the polymer chain. This is represented schematically by the formula A - - - B, wherein A and B are different functional groups.

Suitable conjugated diene hydrocarbons useful in the preparation of the functional polymers of Formulas (I) and (II) include, but are not limited to, 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene.

Examples of polymerizable alkenylsubstituted aromatic hydrocarbons include, but are not limited to, styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphthalene, 1,2-diphenyl-4-methyl-1-hexene and mixtures of these, as well as alkyl, cycloalkyl, aryl, alkylaryl and arylalkyl derivatives thereof in which the total number of carbon atoms in the combined hydrocarbon constituents is generally not greater than 18. Examples of these latter compounds include 3-methylstyrene, 3,5-diethylstyrene, 4-tert-butylstyrene, 2-ethyl-4-benzylstyrene, 4-phenylstyrene, 4-p-tolylstyrene, 2,4-divinyltoluene and 4,5-dimethyl-1-vinylnaphthalene. U.S. Pat. No. 3,377,404, incorporated herein by reference in its entirety, discloses suitable additional alkenylsubstituted aromatic hydrocarbons.

Suitable polar compounds include esters, amides, and nitriles of acrylic and methacrylic acid, and mixtures thereof. Exemplary polar monomers include, without limitation, methyl methacrylate, methyl acrylate, t-butyl methacrylate, t-butyl acrylate, ethyl methacrylate, and N,N-dimethylacrylamide.

Electrophiles that are useful in functionalizing the polymeric living anion include, but are not limited to, alkylene oxides, such as ethylene oxide, propylene oxide, styrene oxide, and oxetane; oxygen; sulfur; carbon dioxide; halogens such as chlorine, bromine and iodine; haloalkyltrialkoxysilanes, alkenylhalosilanes and omega-alkenylarylhalosilanes, such as chlorotrimethylsilane and styrenyldimethyl chlorosilane; sulfonated compounds, such as 1,3-propane sultone; amides, including cyclic amides, such as caprolactam, N-benzylidene trimethylsilylamide, and dimethyl formamide; silicon acetals; 1,5-diazabicyclo [3.1.0]hexane; allyl halides, such as allyl bromide and allyl chloride; methacryloyl chloride; amines, including primary, secondary, tertiary and cyclic amines, such as 3-(dimethylamino)-propyl chloride and N-(benzylidene) trimethylsilylamine; epihalohydrins, such as epichlorohydrin, epibromohydrin, and epiiodohydrin, and other materials as known in the art to be useful for terminating or end capping polymers. These and other useful functionalizing agents are described, for example, in U.S. Pat. Nos. 3,786,116 and 4,409,357, the entire disclosure of each of which is incorporated herein by reference. The polymer is optionally hydrogenated before or after functionalization and/or before or after deprotection.

Exemplary organolithium initiators useful in the present invention include initiators selected from the group-consisting of omega-(tert-alkoxy)-1-alkyllithiums, omega-(tert-alkoxy)-1-alkyllithiums chain extended with conjugated alkadienes, alkenylsubstituted aromatic hydrocarbons, and mixtures thereof, omega-(tert-alkylthio)-1-alkyllithiums, omega-(tert-alkylthio)-1-alkyllithiums chain extended with conjugated alkadienes, alkenylsubstituted aromatic hydrocarbons, and mixtures thereof, omega-(tert-butyldimethylsilyloxy)-1-alkyllithiums, omega-(tert-butyldimethylsilylthio)-1-alkyllithiums, omega-(dialkylamino)-1-alkyllithiums, omega-(dialkylamino)-1-alkyllithiums chain-extended with conjugated alkadienes, alkenylsubstituted aromatic hydrocarbons, and mixtures thereof, and omega-(bis-tert-alkylsilylamino)-1-alkyllithiums.

Initiators useful in the preparation of polymers of Formulas (I) and (II) can also be represented by the following formula:

$$M-R_n-Z-J-[A(R^1R^2R^3)]_x \quad (III)$$

wherein M is an alkali metal; R is a saturated or unsaturated hydrocarbyl group derived by incorporation of a compound selected from the group consisting of conjugated diene hydrocarbons, alkenylsubstituted aromatic hydrocarbons and mixtures thereof; n is an integer from 0 to 5; Z is a branched or straight chain hydrocarbon group which contains 3–25 carbon atoms, optionally containing aryl or substituted aryl groups; J is a hetero atom, e.g., oxygen, sulfur, or nitrogen; A is an element selected from Group IVa of the Periodic Table of Elements; $R^1$, $R^2$, and $R^3$ are each independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups and cycloalkyl and substituted cycloalkyl containing 5 to 12 carbon atoms; and x is dependent on the valence of J and varies from one when J is oxygen or sulfur to two when J is nitrogen.

These initiators can be prepared by reaction of protected organolithium compounds of the following formula:

(IV)

wherein each of M, Z, J, A, $R^1$, $R^2$, $R^3$, and x are the same as defined above with one or more conjugated alkadienes (such as butadiene or isoprene), alkenylsubstituted aromatic hydrocarbons (such as styrene or alpha-methylstyrene), and mixtures thereof, to form an extended hydrocarbon chain between M and Z in Formula (IV), which extended chain is denoted as $R_n$ in Formula (III).

The compounds of Formula (IV) can be prepared by reacting in an inert solvent a selected tertiary amino-1-haloalkane, omega-hydroxy-protected-1-haloalkane, or omega-thio-protected-1-haloalkane, depending on whether J is to be N, O or S, (the alkyl portions of the haloalkyl groups contain 3 to 25 carbon atoms) with an alkali metal, preferably lithium, at a temperature between about 35° C. and about 130° C., preferably at the solvent reflux temperature, to form a protected monofunctional alkali metal initiator (of Formula IV), which is then optionally reacted with a one or more conjugated diene hydrocarbons, one or more alkenylsubstituted aromatic hydrocarbons, or mixtures of one or more dienes with one or more alkenylsubstituted aromatic hydrocarbons, in a predominantly alkane, cycloalkane, or aromatic reaction solvent, which solvent contains 5 to 10 carbon atoms, and mixtures of such solvents to produce a monofunctional initiator with an extended chain or tether between the metal atom (M) and element (J) in Formula (III) above and mixtures thereof with compounds of Formula (IV). R in Formula (III) is preferably derived from conjugated 1,3-dienes. While A in the protecting group $[A(R^1R^2R^3)]$ of the formulae above can be any of the elements in Group IVa of the Periodic Table of the Elements, carbon and silicon currently appear the most useful, especially when polymerizing conjugated dienes.

Incorporation of R groups into the M—Z linkage to form the compounds of Formula (III) above involves addition of compounds of the Formula

where the symbols have the meanings ascribed above, across the carbon to carbon double bonds in compounds selected from the consisting of one or more conjugated diene hydrocarbons, one or more alkenylsubstituted aromatic hydrocarbons, or mixtures of one or more dienes with one or more alkenylsubstituted aromatic hydrocarbons, to produce new carbon-lithium bonds of an allylic or benzylic nature, much like those found in a propagating polyalkadiene or polyarylethylene polymer chain derived by anionic initiation of the polymerization of conjugated dienes or arylethylenes. These new carbon-lithium bonds are now activated toward polymerization and so are much more efficient in promoting polymerization than the precursor M—Z (M=Li) bonds themselves.

Tertiary amino-1-haloalkanes useful in practicing this invention are compounds of the following general structures:

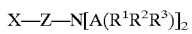

and

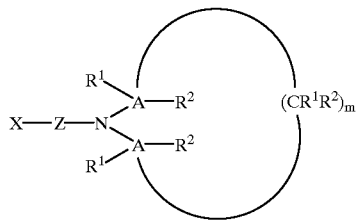

wherein X is halogen, preferably chlorine or bromine; Z is a branched or straight chain hydrocarbon tether or connecting group which contains 3–25 carbon atoms, which tether may also contain aryl or substituted aryl groups; A is an element selected from Group IVa of the Periodic Table of the Elements; $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms; and m is an integer from 1 to 7, and their employment as initiators in the anionic polymerization of olefin containing monomers in an inert, hydrocarbon solvent optionally containing a Lewis base. The process reacts selected tertiary amino-1-haloalkanes whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

Anionic polymerizations employing the tertiary amine initiators are conducted in an inert solvent, preferably a non-polar solvent, optionally containing an ethereal modifier, using an olefinic monomer which is an alkenyl-substituted aromatic hydrocarbon or a 1,3-diene at a temperature of about –30° C. to about 150° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

Tertiary amino-1-haloalkanes useful in the practice of this invention include, but are not limited to, 3-(N,N-dimethylamino)-1-propyl halide, 3-(N,N-dimethylamino)-2-methyl-1-propyl halide, 3-(N,N-dimethylamino)-2,2-dimethyl-1-propyl halide, 4-(N,N-dimethylamino)-1-butyl halide, 5-(N,N-dimethylamino)-1-pentyl halide, 6-(N,N-dimethylamino)-1-hexyl halide, 3-(N,N-diethylamino)-1-propyl halide, 3-(N,N-diethylamino)-2-methyl-1-propyl halide, 3-(N,N-diethylamino)-2,2-dimethyl-1-propyl halide, 4-(N,N-diethylamino)-1-butyl halide, 5-(N,N-diethylamino)-1-pentyl halide, 6-(N,N-diethylamino)-1-hexyl halide, 3-(N-ethyl-N-methylamino)-1-propyl halide, 3-(N-ethyl-N-methylamino)-2-methyl-1-propyl halide, 3-(N-ethyl-N-methylamino)-2,2-dimethyl-1-propyl halide, 4-(N-ethyl-N-methylamino)-1-butyl halide, 5-(N-ethyl-N- methylamino)-1-pentyl halide, 6-(N-ethyl-N-methylamino)-1-hexyl halide, 3-(piperidino)-1-propyl halide, 3-(piperidino)-2-methyl-1-propyl halide, 3-(piperidino)-2,2-dimethyl-1-propyl halide, 4-(piperidino)-1-butyl halide, 5-(piperidino)-1-pentyl halide, 6-(piperidino)-1-hexyl halide, 3-(pyrrolidino)-1-propyl halide, 3-(pyrrolidino)-2-methyl-1-propyl halide, 3-(pyrrolidino)-2,2-dimethyl-1-propyl halide, 4-(pyrrolidino)-1-butyl halide, 5-(pyrrolidino)-1-pentyl halide, 6-(pyrrolidino)-1-hexyl halide, 3-(hexamethyleneimino)-1-propyl halide, 3-(hexamethyleneimino)-2-methyl-1-propyl halide, 3-(hexamethyleneimino)-2,2-dimethyl-1-propyl halide, 4-(hexamethyleneimino)-1-butyl halide, 5-(hexamethyleneimino)-1-pentyl halide, 6-(hexamethyleneimino)-1-hexyl halide, 3-(N-isopropyl-N-methyl)-1-propyl halide, 2-(N-isopropyl-N-methyl)-2-methyl-1-propyl halide, 3-(N-isopropyl-N-methyl)-2,2-dimethyl-1-propyl halide, and 4-(N-isopropyl-N-methyl)-1-butyl halide. The halo- or halide group is preferably selected from chlorine and bromine. omega-hydroxy-protected-1-haloalkanes useful in producing monofunctional ether initiators useful in practicing this invention have the following general structure:

X—Z—O-[C($R^1R^2R^3$)]

wherein X is halogen, preferably chlorine or bromine; Z is a branched or straight chain hydrocarbon group which contains 3–25 carbon atoms, optionally containing aryl or substituted aryl groups; and $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms, and their employment as initiators in the anionic polymerization of olefin containing monomers in an inert, hydrocarbon solvent optionally containing a Lewis base. The process reacts selected omega-hydroxy-protected-1-haloalkanes whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

Anionic polymerizations employing the monofunctional ether initiators are conducted in an inert solvent, preferably a non-polar solvent, optionally containing an ethereal modifier, using an olefinic monomer which is an alkenyl-substituted aromatic hydrocarbon or a 1,3-diene at a temperature of about −30° C. to about 150° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

The precursor omega-protected-1-haloalkanes (halides) can be prepared from the corresponding haloalcohol by standard literature methods. For example, 3-(1,1-dimethylethoxy)-1-chloropropane can be synthesized by the reaction of 3-chloro-1-propanol with 2-methylpropene according to the method of A. Alexakis, M. Gardette, and S. Colin, Tetrahedron Letters, 29, 1988, 2951. The method of B. Figadere, X Franck and A. Cave, Tetrahedron Letters, 34, 1993, 5633, which involves the reaction of the appropriate alcohol with 2-methyl-2-butene catalyzed by boron trifluoride etherate, can be employed for the preparation of the t-amyl ethers. The alkoxy, alkylthio or dialkylamino substituted ethers, for example 6-[3-(methylthio)-1-propyloxy]-1-chlorohexane, can be synthesized by reaction of the corresponding substituted alcohol, for instance 3-methylthio-1-propanol, with an alpha-bromo-omega-chloroalkane, for instance 1-bromo-6-hexane, according to the method of J. Almena, F. Foubelo and M. Yus, Tetrahedron, 51, 1995, 11883. The compound 4-(methoxy)-1-chlorobutane, and the higher analogs, can be synthesized by the ring opening reaction of tetrahydrofuran with thionyl chloride and methanol, according to the procedure of T. Ferrari and P. Vogel, SYNLETT, 1991, 233. The triphenylmethyl protected compounds, for example 3-(triphenylmethoxy)-1-chloropropane, can be prepared by the reaction of the haloalcohol with triphenylmethylchloride, according to the method of S. K. Chaudhary and O. Hernandez, Tetrahedron Letters, 1979, 95.

Omega-hydroxy-protected-1-haloalkanes prepared in accordance with this earlier process useful in practicing this invention include, but are not limited to, 3-(1,1-dimethylethoxy)-1-propyl halide, 3-(1,1-dimethylethoxy)-2-methyl-1-propyl halide, 3-(1,1-dimethylethoxy)-2,2-dimethyl-1-propyl halide, 4-(1,1-dimethylethoxy)-1-butyl halide, 5-(1,1-dimethylethoxy)-1-pentyl halide, 6-(1,1-dimethylethoxy)-1-hexyl halide, 8-(1,1-dimethylethoxy)-1-octyl halide, 3-(1,1-dimethylpropoxy)-1-propyl halide, 3-(1,1-dimethylpropoxy)-2-methyl-1-propyl halide, 3-(1,1-dimethylpropoxy)-2,2-dimethyl-1-propyl halide, 4-(1,1-dimethylpropoxy)-1-butyl halide, 5-(1,1-dimethylpropoxy)-1-pentyl halide, 6-(1,1-dimethylpropoxy)-1-hexyl halide, 8-(1,1-dimethylpropoxy)-1-octyl halide, 4-(methoxy)-1-butyl halide, 4-(ethoxy)-1-butyl halide, 4-(propyloxy)-1-butyl halide, 4-(1-methylethoxy)-1-butyl halide, 3-(triphenylmethoxy)-2,2-dimethyl-1-propyl halide, 4-(triphenylmethoxy)-1-butyl halide, 3-[3-(dimethylamino)-1-propyloxy]-1-propyl halide, 3-[2-(dimethylamino)-1-ethoxy]-1-propyl halide, 3-[2-(diethylamino)-1-ethoxy]-1-propyl halide, 3-[2-(diisopropyl)amino-1-ethoxy]-1-propyl halide, 3-[2-(1-piperidino)-1-ethoxy]-1-propyl halide, 3-[2-(1-pyrrolidino)-1-ethoxy]-1-propyl halide, 4-[3-(dimethylamino)-1-propyloxy]-1-butyl halide, 6-[2-(1-piperidino)-1-ethoxy]-1-hexyl halide, 3-[2-(methoxy)-1-ethoxy]-1-propyl halide, 3-[2-(ethoxy)-1-ethoxy]-1-propyl halide, 4-[2-(methoxy)-1-ethoxy]-1-butyl halide, 5-[2-(ethoxy)-1-ethoxy]-1-pentyl halide, 3-[3-(methylthio)-1-propyloxy]-1-propyl halide, 3-[4-(methylthio)-1-butyloxy]-1-propyl halide, 3-(methylthiomethoxy)-1-propyl halide, 6-[3-(methylthio)-1-propyloxy]-1-hexyl halide, 3-[4-(methoxy)-benzyloxy]-1-propyl halide, 3-[4-(1,1-dimethylethoxy)-benzyloxy]-1-propyl halide, 3-[2,4-(dimethoxy)-benzyloxy]-1-propyl halide, 8-[4-(methoxy)-benzyloxy]-1-octyl halide, 4-[4-(methylthio)-benzyloxy]-1-butyl halide, 3-[4-(dimethylamino)-benzyloxy]-1-propyl halide, 6-[4-(dimethylamino)-benzyloxy]-1-hexyl halide, 5-(triphenylmethoxy)-1-pentyl halide, 6-(triphenylmethoxy)-1-hexyl halide, and 8-(triphenylmethoxy)-1-octyl halide. The halo- or halide group is preferably selected from chlorine and bromine.

U.S. Pat. No. 5,362,699 discloses a process for the preparation of hydrocarbon solutions of monofunctional ether initiators derived from omega-hydroxy-silyl-protected-1-haloalkanes of the following general structure:

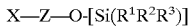

X—Z—O-[Si($R^1R^2R^3$)]

wherein X is halogen, preferably chlorine or bromine; Z is a branched or straight chain hydrocarbon group which contains 3–25 carbon atoms, optionally containing aryl or substituted aryl groups; and $R^1$, $R^2$, and $R^3$ are independently defined as saturated and unsaturated aliphatic and aromatic radicals, and their employment as initiators in the anionic polymerization of olefin containing monomers in an inert, hydrocarbon solvent optionally containing a Lewis base. The process reacts selected omega-hydroxy-protected-1-haloalkanes whose alkyl groups contain 3 to 25 carbon atoms, with lithium metal at a temperature between about 25° C. and about 40° C., in an alkane or cycloalkane reaction solvent containing 5 to 10 carbon atoms and mixtures of such solvents.

Anionic polymerizations employing the monofunctional siloxy ether initiators are conducted in an inert solvent, preferably a non-polar solvent, optionally containing an ethereal modifier, using an olefinic monomer which is an alkenylsubstituted aromatic hydrocarbon or a 1,3-diene at a temperature of about −30° C. to about 150° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

Omega-silyl-protected-1-haloalkanes prepared in accordance with this earlier process useful in practicing this invention include, but are not limited to, 3-(t-butyldimethylsilyloxy)-1-propyl halide, 3-(t-butyldimethylsilyloxy)-2-methyl-1-propyl halide, 3-(t-butyldimethylsilyloxy)-2,2-dimethyl-1-propyl halide, 4-(t-butyldimethylsilyloxy)-1-butyl halide, 5-(t-butyldimethylsilyloxy)-1-pentyl halide, 6-(t-butyldimethylsilyloxy)-1-hexyl halide, 8-(t-butyldimethylsilyloxy)-1-octyl halide, 3-(t-butyldiphenylylsilyloxy)-1-propyl halide, 3-(t-butyldiphenylylsilyloxy)-2-methyl-1-propyl halide, 3-(t-butyldiphenylylsilyloxy)-2,2-dimethyl-1-propyl halide, 4-(t-butyldiphenylylsilyloxy)-1-butyl halide, 6-(t-butyldiphenylsilyloxy)-1-hexyl halide and 3-(trimethylsilyloxy)-2,2-dimethyl-1-propyl halide. The halo- or halide group is preferably selected from chlorine and bromine.

Monofunctional thioether initiators useful in the practice of this invention are derived from omega-thio-protected-1-haloalkanes of the following general structure:

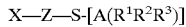

$$X-Z-S-[A(R^1R^2R^3)]$$

wherein X is halogen, preferably chlorine or bromine; Z is a branched or straight chain hydrocarbon group which contains 3–25 carbon atoms, optionally containing aryl or substituted aryl groups; $[A(R^1R^2R^3)]$ is a protecting group in which A is an element selected from Group IVa of the Periodic Table of the Elements, and $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms, and their employment as initiators in the anionic polymerization of olefin containing monomers in an inert, hydrocarbon solvent optionally containing a Lewis base. The process reacts selected omega-thioprotected-1-haloalkyls whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

Anionic polymerizations employing the monofunctional thioether initiators are conducted in an inert solvent, preferably a non-polar solvent, optionally containing an ethereal modifier, using an olefinic monomer which is an alkenyl-substituted aromatic hydrocarbon or a 1,3-diene at a temperature of about −30° C. to about 150° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

The initiator precursor, omega-thio-protected-1-haloalkanes (halides), can be prepared from the corresponding halothiol by standard literature methods. For example, 3-(1,1-dimethylethylthio)-1-propylchloride can be synthesized by the reaction of 3-chloro-1-propanthiol with 2-methylpropene according to the method of A. Alexakis, M. Gardette, and S. Colin, Tetrahedron Letters, 29, 1988, 2951. Alternatively, reaction of 1,1-dimethylethylthiol with 1-bromo-3-chloropropane and a base affords 3-(1,1-dimethylethylthio)-1-propylchloride. The method of B. Figadere, X. Franck and A. Cave, Tetrahedron Letters, 34, 1993, 5893, which involves the reaction of the appropriate thiol with 2-methyl-2-butene catalyzed by boron trifluoride etherate, can be employed for the preparation of the t-amyl ethers. Additionally, 5-(cyclohexylthio)-1-pentylhalide and the like, can be prepared by the method of J. Almena, F. Foubelo, and M. Yus, Tetrahedron, 51, 1995, 11883. This synthesis involves the reaction of the appropriate thiol with an alkyllithium, then reaction of the lithium salt with the corresponding alpha, omega dihalide. 3-(Methylthio)-1-propylchloride can be prepared by chlorination of the corresponding alcohol with thionyl chloride, as taught by D. F. Taber and Y. Wang, J. Org, Chem., 58, 1993, 6470. Methoxymethylthio compounds, such as 6-(methoxymethylthio)-1-hexylchloride, can be prepared by the reaction of the omega-chloro-thiol with bromochloromethane, methanol, and potassium hydroxide, by the method of F. D. Toste and I. W. J. Still, Synlett, 1995, 159. T-Butyldimethylsilyl protected compounds, for example 4-(t-butyldimethylsilylthio)-1-butylhalide, can be prepared from t-butyldimethylchlorosilane, and the corresponding thiol, according to the method described in U.S. Pat. No. 5,493,044.

Omega-thio-protected 1-haloalkanes prepared in accordance with this earlier process useful in practicing this invention include, but are not limited to, 3-(methylthio)-1-propylhalide, 3-(methylthio)-2-methyl-1-propylhalide, 3-(methylthio)-2,2-dimethyl-1-propylhalide, 4-(methylthio)-1-butylhalide, 5-(methylthio)-1-pentylhalide, 6-(methylthio)-1-hexylhalide, 8-(methylthio)-1-octylhalide, 3-(methoxymethylthio)-1-propylhalide, 3-(methoxymethylthio)-2-methyl-1-propylhalide, 3-(methoxymethylthio)-2,2-dimethyl-1-propylhalide, 4-(methoxymethylthio)-1-butylhalide, 5-(methoxymethylthio)-1-pentylhalide, 6-(methoxymethylthio)-1-hexylhalide, 8-(methoxymethylthio)-1-octylhalide, 3-(1,1-dimethylethylthio)-1-propylhalide, 3-(1,1-dimethylethylthio)-2-methyl-1-propylhalide, 3-(1,1-dimethylethylthio)-2,2-dimethyl-1-propylhalide, 4-(1,1-dimethylethylthio)-1-butylhalide, 5-(1,1-dimethylethylthio)-1-pentylhalide, 6-(1,1- dimethylethylthio)-1-hexylhalide, 8-(1,1-dimethylethylthio)-1-octylhalide, 3-(1,1-dimethylpropylthio)-1-propylhalide, 3-(1,1-dimethylpropylthio)-2-methyl-1-propylhalide, 3-(1,1-dimethylpropylthio)-2,2-dimethyl-1-propylhalide, 4-(1,1-dimethylpropylthio)-1-butylhalide, 5-(1,1-dimethylpropylthio)-1-pentylhalide, 6-(1,1-dimethylpropylthio)-1-hexylhalide, 8-(1,1-dimethylpropylthio)-1-octylhalide, 3-(cyclopentylthio)-1-propylhalide, 3-(cyclopentylthio)-2-methyl-1-propylhalide, 3-(cyclopentylthio)-2,2-dimethyl-1-propylhalide, 4-(cyclopentylthio)-1-butylhalide, 5-(cyclopentylthio)-1-pentylhalide, 6-(cyclopentylthio)-1-hexylhalide, 8-(cyclopentylthio)-1-octylhalide, 3-30 (cyclohexylthio)-1-propylhalide, 3-(cyclohexylthio)-2-methyl-1-propylhalide, 3-(cyclohexylthio)-2,2-dimethyl-1-propylhalide, 4-(cyclohexylthio)-1-butylhalide, 5-(cyclohexylthio)-1-pentylhalide, 6-(cyclohexylthio)-1-hexylhalide, 8-(cyclohexylthio)-1-octylhalide, 3-(t-butyldimethylsilylthio)-1-propylhalide, 3-(t-butyldimethylsilylthio)-2-methyl-1-propylhalide, 3-(t-butyldimethylsilylthio)-2,2-dimethyl-1-propylhalide, 3-(t-butyldimethylsilylthio)-2-methyl-1-propylhalide, 4-(t-butyldimethylsilylthio)-1-butylhalide, 6-(t-butyldimethylsilylthio)-1-hexylhalide and 3-(trimethylsilylthio)-2,2-dimethyl-1-propylhalide. The halo- or halide group is preferably selected from chlorine and bromine.

Examples of functionalized organolithium initiators (III) include, but are not limited to, tert-alkoxy-alkyllithiums such as 3-(1,1-dimethylethoxy)-1-propyllithium and its more hydrocarbon-soluble isoprene chain-extended oligomeric analog (n=2), 3-(tert-butyldimethylsilyloxy)-1-propyllithium (n=0), tert-alkylthio-alkyllithiums such as 3-(1,1-dimethylethylthio)-1-propyllithium and its more hydrocarbon-soluble isoprene chain-extended oligomeric analog (n=2), 3-(dimethylamino)-1-propyllithium and its more hydrocarbon-soluble isoprene chain-extended oligomeric analog (n=2) and 3-(di-tert-butyldimethylsilylamino)-1-propyllithium, and mixtures thereof. Further examples of protected functionalized initiators that may be employed in this invention include, but are not limited to, 3-(1,1-dimethylethoxy)-1-propyllithium, 3-(1,1-dimethylethoxy)-2-methyl-1-propyllithium, 3-(1,1-dimethylethoxy)-2,2-dimethyl-1-propyllithium, 4-(1,1-dimethylethoxy)-1-butyllithium, 5-(1,1-dimethylethoxy)-1-pentyllithium, 6-(1,1-dimethylethoxy)-1-hexyllithium, 8-(1,1-dimethylethoxy)-1-octyllithium, 3-(1,1-dimethylpropoxy)-1-propyllithium, 3-(1,1-dimethylpropoxy)-2-methyl-1-propyllithium, 3-(1,1-dimethylpropoxy)-2,2-dimethyl-1-propyllithium, 4-(1,1-dimethylpropoxy)-1-butyllithium, 5-(1,1-dimethylpropoxy)-1-pentyllithium, 6-(1,1-dimethylpropoxy)-1-hexyllithium, 8-(1,1-dimethylpropoxy)-1-octyllithium, 3-(t-butyldimethylsilyloxy)-1-propyllithium, 3-(t-butyldimethylsilyloxy)-2-methyl-1-propyllithium, 3-(t-butyldimethylsilyloxy)-2,2-dimethyl-1-propyllithium, 4-(t-butyldimethylsilyloxy)-1-butyllithium, 5-(t-butyldimethylsilyloxy)-1-pentyllithium, 6-(t-butyldimethylsilyloxy)-1-hexyllithium, 8-(t-butyldimethylsilyloxy)-1-octyllithium and 3-(trimethylsilyloxy)-2,2-dimethyl-1-propyllithium, 3-(dimethylamino)-1-propyllithium, 3-(dimethylamino)-2-methyl-1-propyllithium, 3-(dimethylamino)-2,2-dimethyl-1-propyllithium, 4-(dimethylamino)-1-butyllithium, 5-(dimethylamino)-1-pentyllithium, 6-(dimethylamino)-1-hexyllithium, 8-(dimethylamino)-1-propyllithium, 4-(ethoxy)-1-butyllithium, 4-(propyloxy)-1-butyllithium, 4-(1-methylethoxy)-1-butyllithium, 3-(triphenylmethoxy)-2,2-dimethyl-1-propyllithium, 4-(triphenylmethoxy)-1-butyllithium, 3-[3-(dimethylamino)-1-propyloxy]-1-propyllithium, 3-[2-(dimethylamino)-1-ethoxy]-1-propyllithium, 3-[2-(diethylamino)-1-ethoxy]-1-propyllithium, 3-[2-(diisopropyl)amino)-1-ethoxy]-1-propyllithium, 3-[2-(1-piperidino)-1-ethoxy]-1-propyllithium, 3-[2-(1-pyrrolidino)-1-ethoxyl-1-propyllithium, 4-[3-(dimethylamino)-1-propyloxy]-1-butyllithium, 6-(2-(1-piperidino)-1-ethoxy]-1-hexyllithium, 3-[2-(methoxy)-1-ethoxy]-1-propyllithium, 3-(2-(ethoxy)-1-ethoxyl-1-propyllithium, 4-[2-(methoxy)-1-ethoxy]-1-butyllithium, 5-[2-(ethoxy)-1-ethoxy]-1-pentyllithium, 3-[3-(methylthio)-1-propyloxy]-1-propyllithium, 3-[4-(methylthio)-1-butyloxy]-1-propyllithium, 3-(methylthiomethoxy)-1-propyllithium, 6-[3-(methylthio)-1-propyloxy]-1-hexyllithium, 3-[4-(methoxy)-benzyloxy]-1-propyllithium, 3-[4-(1,1-dimethylethoxy)-benzyloxy]-1-propyllithium, 3-[2,4-(dimethoxy)-benzyloxy]-1-propyllithium, 8-[4-(methoxy)-benzyloxy]-1-octyllithium, 4-[4-(methylthio)-benzyloxy]-1-butyllithium, 3-[4-(dimethylamino)-benzyloxy]-1-propyllithium, 6-[4-(dimethylamino)-benzyloxy]-1-hexyllithium, 5-(triphenylmethoxy)-1-pentyllithium, 6-(triphenylmethoxy)-1-hexyllithium, and 8-(triphenylmethoxy)-1-octyllithium, 3-(hexamethyleneimino)-1-propyllithium, 4-(hexamethyleneimino)-1-butyllithium, 5-(hexamethyleneimino)-1-pentyllithium, 6-(hexamethyleneimino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium, 6-(t-butyldimethylsilylthio)-1-hexyllithium, 3-(trimethylsilylthio)-2,2-dimethyl-1-propyllithium, 3-(1,1-dimethylethylthio)-1-propyllithium, 3-(1,1-dimethylethylthio)-2-methyl-1-propyllithium, 3-(1,1-dimethylethylthio)-2,2-dimethyl-1-propyllithium, 4-(1,1-dimethylethylthio)-1-butyllithium, 5-(1,1-dimethylethylthio)-1-pentyllithium, 6-(1,1-dimethylethylthio)-1-hexyllithium; 8-(1,1-dimethylethylthio)-1-octyllithium, 3-(1,1-dimethylpropylthio)-1-propyllithium, 3-(1,1-dimethylpropylthio)-2-methyl-1-propyllithium, 3-(1,1-dimethylpropylthio)-2,2-dimethyl-1-propyllithium, 4-(1,1-dimethylpropylthio)-1-butyllithium, 5-(1,1-dimethylpropylthio)-1-pentyllithium, 6-(1,1-dimethylpropylthio)-1-hexyllithium, and 8-(1,1-dimethylpropylthio)-1-octyllithium and their more hydrocarbon soluble conjugated alkadiene, alkenylsubstituted aromatic hydrocarbon, and mixtures thereof, chain extended oligomeric analogs (n=1–5).

Non-polar compounds are preferably polymerized in a non-polar solvent such as a hydrocarbon (as described above), since anionic polymerization in the presence of such non-polar solvents is known to produce polyenes with high 1,4-contents from 1,3-dienes. Polar solvents (modifiers) can be added to the polymerization reaction to alter the microstructure of the resulting polymer, i.e., increase the proportion of 1,2 (vinyl) microstructure or to promote functionalization or randomization. The amount of the polar modifier added depends on the vinyl content desired, the nature of the monomer, the temperature of the polymerization, and the identity of the polar modifier. For polar monomers, preferred polymerization solvents are polar solvents, although a hydrocarbon, or mixtures of polar and hydrocarbon solvents can also be used.

The polymers of Formulas (I) or (II) can optionally be hydrogenated, either before or after deprotection. Suitable hydrogenation techniques are described in U.S. Pat. Nos. 4,970,254, 5,166,277, 5,393,843 and 5,496,898, the entire disclosure of each of which is incorporated by reference. The hydrogenation of the functionalized polymer is conducted in situ, or in a suitable solvent, such as hexane, cyclohexane or heptane. This solution is contacted with hydrogen gas in the presence of a catalyst, such as a nickel catalyst. The hydrogenation is typically performed at temperatures from 25° C. to 150° C., with a archetypal hydrogen pressure of 15 psig to 1000 psig. The progress of this hydrogenation can be monitored by InfraRed (IR) spectroscopy or Nuclear Magnetic Resonance (NMR) spectroscopy. The hydrogenation reaction is conducted until at least 90% of the aliphatic unsaturation has been saturated. The hydrogenated functional polymer is then recovered by conventional procedures, such as removal of the catalyst with aqueous acid wash, followed by solvent removal or precipitation of the polymer.

Functionalized polymers of Formulas (I) or (II) can be further reacted with other comonomers, such as di or polyesters, di- or polyisocyanates, di-, poly-, or cyclic amides, di- and polycarboxylic acids, and di- and polyols. For example, a protected functional polymer can be treated using the acid catalysts as described above in the presence of a suitable comonomer to simultaneously deprotect the functional polymer and polymerize the functional end(s) thereof to produce novel segmented block polymers. Alternatively, deprotecting conditions can be selected so as to copolymerize one functional end thereof with a suitable comonomer while maintaining the integrity of the other protecting group to provide a functional block copolymer. Still another alternative is to remove the protecting group of the functional polymer of Formulas (I) or (II) and to polymerize a functional block copolymer of the preceding sentence with the same or other comonomers to produce novel segmented block polymers.

Still further, as noted above, multi-branched or star-shaped polymers with protected functional groups, or their optionally hydrogenated analogues, can also be deprotected in accordance with the process of the invention. Star polymers can be produced using the functional initiators (III) described above (singly or combinations-thereof), which, by design, incorporate the versatility of functional branch ends in the star polymers. For example, hydroxy-, thio-, or amino-terminated functional branches can be copolymerized with comonomers, such as organic diacids (such as carboxylic acids), diisocyanates, and the like. The copolymers can also include non-functional branches in the polymer. This can provide improved impact resistance in molecules resulting from further copolymerization of the star-shaped polymers with other functional comonomers, for example, resultant polyester and/or polyamide molecules.

Novel multi-branched or star-shaped polymers having functional ends can be produced by polymerizing alkenyl-substituted aromatic hydrocarbons, conjugated dienes, and polar compounds, singly, sequentially, or as mixtures thereof, as described above, with protected functional organolithium initiators of Formula (III) (singly or as combinations thereof to provide arms having different protecting groups and/or different functional groups), and subsequently reacting the resulting copolymer with multifunctional linking agents. This can lead to polymer anion chain lengths of approximately the same size.

Examples of useful linking or coupling agents useful for hydrocarbon monomers include halosilanes, such as silicon tetrachloride and methyl trichlorosilane; halostannanes, such as tin tetrachloride; phosphorus halides, such as phosphorus trichloride; and isomeric (mixtures of ortho, meta and para) dialkenylaryls and isomeric di- and trivinylaryls, such as 1,2-divinylbenzene, 1,3-divinylbenzene, 1,4-divinylbenzene, 1,2,4-trivinylbenzenes, 1,3-divinylnaphthalenes, 1,8-divinylnaphthalene, 1,2-diisopropenylbenzene, 1,3-diisopropenylbenzene, 1,4-diisopropenylbenzene, 1,3,5-trivinylnaphthalene, and other suitable materials known in the art to be useful for coupling polymers, as well as mixtures of coupling agents. See also U.S. Pat. Nos. 3,639,517 and 5,489,649, and R. P. Zelinski et al in J.Polym.Sci., A3, 93, (1965) for these and additional coupling agents. This linking process is described, for example, in U.S. Pat. No. 4,409,357 and by L. J. Fetters in Macromolecules, 9,732 (1976). Useful linking agents for polar monomers include, without limitation, reactive halogen compounds, such as $\alpha,\alpha'$-dibromo-p-xylene and $\alpha,\alpha',\alpha''$-tribromo-mesitylene, multifunctional acrylates, such as ethylene glycol dimethylacrylate and glycerol trimethacrylate, and the like. Mixtures of coupling agents can also be used. Generally, the amount of coupling agent used is such that the molar ratio of protected living polymer anions to coupling agents ranges from 1:1 to 24:1.

Nonfunctional initiators (such as n-butyllithium, sec-butyllithium, and tert-butyllithium) may also be mixed with the functional initiators of Formula (III) to provide non-functional branch ends as well, which can serve to modify the physical properties of these star-shaped or radiating polymers, especially after their further copolymerization with other functional monomers, such as organic diacids or organic diisocyanates.

Alternatively, novel multi-branched or star-shaped polymers possessing functional ends which may be the same or different, and/or both functional and non-functional ends, may be produced by separately polymerizing alkenylsubstituted aromatic hydrocarbons, conjugated dienes, or polar monomers, as described above, with protected functional initiators (III) and/or with non-functional organolithium initiators, subsequently mixing the resulting separately produced anions, treating the resulting mixture with multifunctional linking agents, and optionally hydrogenating before or after optionally deprotecting the functional ends of the polymer. This alternative method allows for control of the molecular weight of the arms of the star polymer (for example, different polymer anion chain lengths can be produced) and provides for a more selective control of the physical properties of the resultant polymers.

The protecting groups can be removed from the ends of the arms of the star polymer, prior to or after optional hydrogenation of the residual unsaturation of the arms, using the techniques described above. This includes selective deprotection when different protecting groups are present, as detailed above. The star polymers thus formed may have hydroxyl, thio, and/or amino functional branch ends.

Molecular weights of the resulting linked or coupled polymers can vary depending on the molecular weight of the polymer anion and the number of potential functional linking groups on a coupling agent. The sizes of the branches of the linked polymer can be the same or vary.

Additionally, the process of the invention is useful for deprotecting a wide variety of symmetrically or asymmetrically functional polymers produced by reacting the living polymers described above with various functionalizing agents. For example, addition of carbon dioxide (see

*J.Polym.Sci., Polym.Chem.* 30, 2349 (1992)) to a living polymer having a protected hydroxyl group would produce a polymer with one protected hydroxyl and one carboxyl group, or the living polymer may be reacted with 1,5 diazabicyclo-(3.1.0) hexane as described in U.S. Pat. No. 4,753,991 to produce a polymer with one protected hydroxyl and one amino group. A polymer with one protected hydroxyl group and one protected amino group can be prepared by reaction of the living anion with a protected amino propyl bromide, see Macromolecules, 23, 939 (1990). Reaction of the living polymer anion with oxetane or substituted oxetanes (see U.S. Pat. No. 5,391,637) would afford a polymer which contained one protected hydroxyl and a hydroxyl group. A polymer with two protected hydroxyl groups can be prepared by reaction of the living anion with a silicon derived acetal, see U.S. Pat. No. 5,478,899.

Other polymers which can be deprotected in accordance with the present invention include asymmetrically substituted monofunctional polymers having epoxy or isocyanate groups at one end, for example, by reacting the lithium salt of the living polymers described above having a protected hydroxyl group (before hydrolysis), with epichlorohydrin or by reacting the lithium salt itself with an equivalent of a diisocyanate, such as methylene 4,4-diphenyl diisocyanate (2/1 NCO/OH). These unsymmetrically substituted functional polymers could then be further reacted with other comonomers either with or without simultaneous deprotection as described below.

Protected dihydroxy polymers alone and in their hydrogenated forms could be used as base materials to lend flexibility and higher impact strength in a number of formulas to produce coatings, sealants, binders and block copolymers with polyesters, polyamides and polycarbonates as described in UK Patent Application GB2270317A and in "Polytail" data sheets and brochures (Mitsubishi Kasei America).

In the presence of acidic catalysts used to promote the formation of many of these block copolymer resins, the protecting group of the hydrogenated polymer is removed as well, allowing the exposed hydroxyl grouping in the base polymer molecule to simultaneously participate in the block copolymer reaction.

For example, hydrogenated polymers may be reacted with bisphenol A and phosgene in the presence of appropriate catalysts with simultaneous deprotection to yield a polycarbonate alternating block copolymer. The resulting products are useful as molding resins, for example, to prepare interior components for automobiles.

A segmented polyamide-hydrogenated block copolymer is also useful as a molding composition to prepare exterior automotive components and can be prepared, for example, by reacting hydrogenated polymers with caprolactam or adipic acid and a diamine in the presence of a suitable catalyst.

A segmented polyester-hydrogenated block copolymer can be produced by reaction of hydrogenated polymers with dimethyl terephthalate and a diol and a suitable acidic catalyst. Again, the products are useful as molding compounds for exterior automotive components.

Isocyanate-terminated prepolymers can be produced from hydrogenated polymers by reaction with suitable diisocyanates (2/1 NCO/OH) as above and which can be further reacted with diols and additional diisocyanates to form segmented polyurethanes useful for water based, low VOC coatings. Inclusion of acid functional diols, such as dimethylolpropionic acid, in the polyurethane introduces pendant carboxyl groups which can be neutralized with tertiary amines to afford water dispersable polyolefin/polyurethane segmented polymers, useful for water based coatings. This same principle could be applied to acrylic polymers made with tertiary amine functional monomers included, which could be made by free radical polymerization following reacting the hydroxyl groups at the terminal ends of the polymer with acryloyl chloride or methacryloyl chloride. Segmented polyurethane prepolymers may be mixed with tackifying resins and used as a moisture-curable sealant, caulk or coating.

Another possible application in coatings would be the use of new dendrimers, based on the use of the polymer with hydroxyl functionality at the termini thereof to form the core for dendritic hybrid macromolecules based on condensation or addition polymerizations, utilizing the hydroxyl functionality as the initiating site (see, for example Gitsov and Frechet, American Chemical Society PMSE Preprints, Volume 73, August 1995).

Yet another application includes use as toughening polymers for epoxy composites, utilizing the polymer core with the hydroxyl groups converted to half esters by reaction with anhydrides. These epoxy reactive polymers can then be utilized as reactants with epoxy resins and amines in composite systems. Reacting the hydroxyl functional polymers into unsaturated polyesters provides a new polymer toughening system for polyester molding compounds for automotive and other uses. For a review of the use of linear polymers for toughening of epoxies and polyesters, see "Rubber-Toughened Plastics", Edited By C.Keith Riew, ACS Advances in Chemistry Series, #222.

Cathodic electrodepositabie coatings may be prepared from epoxy functional polymers described above by reacting with epoxy resins in the presence of excess amine or polyamine, to completely react all the epoxy groups, distilling off excess amine, and neutralizing the resulting epoxyamine adduct with water soluble organic or inorganic acids to form water soluble, quaternary ammonium containing polymer salts (see for reference, U.S. Pat. Nos. 3,617,458, 3,619,398, 3,682,814, 3,891,527, 3,947,348, and 4,093,594). Alternatively, the above epoxy-amine polymer adducts may be converted to quaternary phosphonium or sulfonium ion containing polymers, as described in U.S. Pat. No. 3,935,087.

An acrylate-terminated prepolymer curable by free-radical processes can be prepared from a protected hydroxy, hydrogenated polymer by reaction with a diisocyanate (2NCO/OH) followed by further reaction with hydroxyethyl acrylate in the presence of a basic reagent.

Another likely application for functionally terminated polymers include use as viscosity index (V.I.) improvers. Using carboxyl functional monomers, such as acrylic acid and methacrylic acid, and/or amine functional monomers such as acrylamide, along with free radical initiators in further polymerizations, can result in the formation of polymer segments at the periphery of each termini with amine or other functionalities which, in addition to the advantageous properties of the polymers as V.I. improvers, combines the ability to add functionality to the polymers for dispersant properties (see, for example, U.S. Pat. Nos. 5,496,898, 4,575,530, 4,486,573, 5,290,874, 5,290,868, 4,426,374, and 5,272,211).

The versatility of the hydroxyl functional polymers of this invention, and the wide range of different segmented polymers (polyethers, polyesters, polyamides, polycarbonates, polyurethanes, etc.) which can be initiated at the hydroxyl groups, leads to numerous possible applications as compatibilizers for polymer blends and alloys. In addition to the use of such blends for new applications, much recent interest is generated in the use of compatibilizers to facilitate polymer waste recycling.

The polar functional groups on the polymer chain ends allow the polymers of this invention to alter the surface properties of polymers like polyethylene (including high density polyethylene, low density polyethylene, and linear low density polyethylene), polypropylene, polyisobutylene and copolymers and blends thereof. When the polymers of this invention are blended with non-polar polyolefins, the polar functional groups on the chain ends, being incompatible with the non-polar polyolefin, will phase separate and migrate to the surface of the polyolefin. The polymers of the invention can be added to the polyolefin in amounts from 1 to 25% by weight based on the weight of the polyolefin. Properties such as surface adhesion are thus greatly enhanced, leading to improved adhesion of pigments in printing inks for labels, composite layering, and other adhesive applications. An alternative approach to modification of polymer surfaces to alter properties by introduction of functional groups has been the use of chemical reagents such as alkyllithiums (see, for example, A. J. Dias, K-W Lee, and T. J. McCarthy, Rubber & Plastics News, 18–20, Oct. 31, 1988, and A. J. Dias and T. J. McCarthy, Macromolecules, 20, 1437 (1987)).

Alternatively, protecting groups may be removed, either before or after optional hydrogenation of the aliphatic unsaturation, then the functional terminated polymer may be reacted with functional comonomers to produce novel copolymers using these and other processes. Thus, for example, a hydroxy terminated polymer may be hydrogenated, and then reacted with ethylene oxide in the presence of potassium tert-butoxide to produce a poly (ethylene oxide)-hydrogenated block copolymer. This reaction sequence affords a hydrogel.

Alternatively, the protected functional polymer may be reacted with functional comonomers, without simultaneously removing the protecting group. These copolymers then may be deprotected and then further reacted with the same or different comonomers to form yet other novel copolymers. Thus, for example, a hydroxyterminated polymer may be hydrogenated, and then reacted with ethylene oxide in the presence of potassium tert-butoxide to produce a poly(ethylene oxide)-hydrogenated copolymer with one protected hydroxyl group on the polymer segment. This protected hydroxyl can then be deprotected and a poly (ethylene oxide) polymer having different chain lengths grown onto both ends of the polymer.

In another possible application, a living polymer may be reacted with an alkenylarylhalosilane, such as styrenyldimethylchlorosilane, to yield the corresponding omega-styrenyl terminated macromonomer according to the teachings of U.S. Pat. No. 5,278,244, which may then be further polymerized by a variety of techniques to yield "comb" polymers which, on deprotection and hydrogenation yield branched polymers with, for example, hydroxyfunctionality on the branch-ends. Such multi-functionality can be utilized to graft a water-soluble polymer such as polyethylene oxide onto a hydrophobic polyolefinic core to produce hydrogels.

In still another possible application, hydrogenated hydroxyterminated branches of the polymers may be further reacted with acryloyl chloride or methacryloyl chloride, and the resultant acrylate or methacrylate-terminated polymer further polymerized with monomers selected from the group of alkyl acrylates, alkyl methacrylates, and dialkylacrylamides to produce hydrogels. Further, acrylate or methacrylate-terminated polymers may be polymerized by free-radical processes.

The present invention will be further illustrated by the following non-limiting examples.

EXAMPLE 1

Deprotection of Tert-Butoxy Group from Polybutadiene with Amberlyst® 15 and Heat Polybutadiene polymer having a tert-butoxy end group (0.5 g, $1.515\times10^{-4}$ mole) and Amberlyst®15 ion exchange resin (0.025 g, Aldrich) were heated under nitrogen from 20–200° C. at a heating rate of 10° C./min. A Hi-Res Thermogravimetric Analyzer 2950 and Thermal Analyst 2000 (TA Instruments) were used to monitor the weight loss resulting from the elimination of isobutylene from the base polymer. Complete deprotection (loss of tert-butoxy signal) was determined by $^1$H NMR analysis of the resulting polymer residue. Base polymer MW (GPC) before deprotection: $M_n$=3300; $M_w$=3500; $M_w/M_n$=1.07.

EXAMPLE 2

Deprotection of Tert-Butoxy Group from Polybutadiene with Amberlyst® 15 and Heat Polybutadiene with a tert-butoxy protecting group (0.5 g, $1.515\times10^{-4}$ mole) and Amberlyst® 15 ion exchange resin (0.025 g, Aldrich) were heated under nitrogen at 150° C. for 20 min. A Hi-Res Thermogravimetric Analyzer 2950 and Thermal Analyst 2000 (TA Instruments) were used to monitor the weight loss resulting from the elimination of isobutylene from the base polymer. Complete deprotection (loss of tert-butoxy signal) was determined by $^1$H NMR analysis of the resulting polymer residue. Base polymer MW (GPC) before deprotection: $M_n$=3300; $M_w$=3500; $M_w/M_n$=1.07.

EXAMPLE 3

Deprotection of Tert-Butoxy Group from Polybutadiene with Amberlyst® 15 in Refluxing Cyclohexane Polybutadiene with a tert-butoxy protecting group (1.5 g, $3.448\times10^{-4}$ mole) and Amberlyst® 15 ion exchange resin (1.5 g, ground powder, Aldrich) were combined in cyclohexane (10 ml). The mixture was heated to reflux for 6 hours and monitored by thin layer chromatography (TLC). The product solution was filtered to remove the Amberlyst® 15 resin. The polymer was precipitated in methanol. The solvent was evaporated under reduced pressure to give hydroxy-terminated polybutadiene. Complete deprotection was determined by $^1$H NMR analysis (loss of tert-butoxy signal). Base polymer MW (GPC) before deprotection: $M_n$=4350; $M_w$=4700; $M_w/M_n$=1.09; 1,4-microstructure 87%.

EXAMPLE 4

Deprotection of Tert-Amyloxy Group from Polybutadiene with Amberlyst® 15 in Refluxing Cyclohexane Polybutadiene with a tert-amyloxy protecting group (1.5 g, $3.125\times10^{-4}$ mole) and Amberlyst® 15 ion exchange resin (1.5 g, ground powder, Aldrich) were combined in cyclohexane (10 ml). The mixture was heated to reflux for 15 hours and monitored by thin layer chromatography (TLC).

The product solution was filtered to remove the Amberlyst® 15 resin. The polymer was precipitated in methanol. The solvent was evaporated under reduced pressure to give hydroxy-terminated polybutadiene. Complete deprotection was determined by $^1$H NMR analysis (loss of tert-amyloxy signal). Base polymer MW (GPC) before deprotection: $M_n$=4800; $M_w$=5100; $M_w/M_n$=1.07; 1,4-microstructure 86%.

EXAMPLE 5

Deprotection of Tert-Butoxy Group from Polybutadiene with Amberlyst® 15 in Refluxing Tert-Butylbenzene Polybutadiene with a tert-butoxy protecting group (1.5 g, 3.448×10$^{-4}$ mole) and Amberlyst® 15 ion exchange resin (1.5 g, ground powder, Aldrich) were combined in tert-butylbenzene (10 ml). The mixture was heated to 170° C. for 5 hours and monitored by thin layer chromatography (TLC). The product solution was filtered to remove the Amberlyst® 15 resin. The polymer was precipitated in methanol. The solvent was evaporated under reduced pressure to give hydroxy-terminated polybutadiene. Complete deprotection was determined by $^1$H NMR analysis (loss of tert-butoxy signal). Base polymer MW (GPC) before deprotection: $M_n$=4350; $M_w$=4700; $M_w/M_n$=1.09; 1,4-microstructure 87%.

EXAMPLE 6

Deprotection of Tert-Butoxy Group from Polyisoprene with Amberlyst® 15 in Refluxing Cyclohexane Polyisoprene with a tert-butoxy protecting group (1.5 g, 2.121×10$^{-4}$ mole) and Amberlyst® 15 ion exchange resin (1.5 g, ground powder, Aldrich) were combined in cyclohexane (10 ml). The mixture was heated to reflux for 6 hours and monitored by thin layer chromatography (TLC). The product solution was filtered to remove the Amberlyst® 15 resin. The polymer was precipitated in methanol. The solvent was evaporated under reduced pressure to give hydroxy-terminated polyisoprene. Complete deprotection was determined by $^1$H NMR analysis (loss of tert-butoxy signal). Base polymer MW (GPC) before deprotection: $M_n$=6910; $M_w$=7370; $M_w/M_n$=1.08.

EXAMPLE 7

Deprotection of Tert-Amyloxy Group from Polyisoprene with Amberlyst® 15 in Refluxing Cyclohexane Polyisoprene polymer with a tert-amyloxy protecting group (1.5 g, 2.021×10$^{-4}$ mole) and Amberlyst® 15 ion exchange resin (1.5 g, ground powder, Aldrich) were combined in cyclohexane (10 ml). The mixture was heated to reflux for 12 hours and monitored by thin layer chromatography (TLC). The product solution was filtered to remove the Amberlyst® 15 resin. The polymer was precipitated in methanol. The solvent was evaporated under reduced pressure to give hydroxy-terminated polyisoprene. Complete deprotection was determined by $^1$H NMR analysis (loss of tert-amyloxy signal). Base polymer MW (GPC) before deprotection: $M_n$=7420; $M_w$=7940; $M_w/M_n$=1.07.

EXAMPLE 8

Deprotection of Tert-Butoxy Group from Polystyrene with Amberlyst® 15 in Refluxing Tert-Butylbenzene Polystyrene with a tert-butoxy protecting group (1.5 g, 3.658×10$^{-4}$ mole) and Amberlyst® 15 ion exchange resin (1.5 g, ground powder, Aldrich) were combined in tert-butylbenzene (10 ml). The mixture was heated to reflux for 2 hours and monitored by thin layer chromatography (TLC). The product solution was filtered to remove the Amberlyst® 15 resin. The polymer was precipitated in methanol. The solvent was evaporated under reduced pressure to give hydroxy-terminated polystyrene. Complete deprotection was determined by $^1$H NMR analysis (loss of tert-butoxy signal). Base polymer MW (GPC) before deprotection: $M_n$=4100; $M_w/M_n$=1.17.

EXAMPLE 9

Deprotection of Tert-Butoxy Group from Polystyrene with Amberlyst® in Refluxing Cyclohexane Polystyrene with a tert-butoxy protecting group (1.5 g, 1.875×10$^{-4}$ mole) and Amberlyst® 15 ion exchange resin (1.5 g, ground powder, Aldrich) were combined in cyclohexane (10 ml). The mixture was heated to reflux for 6 hours and monitored by thin layer chromatography (TLC). The product solution was filtered to remove the Amberlyst® 15 resin. The polymer was precipitated in methanol. The solvent was evaporated under reduced pressure to give hydroxy-terminated polystyrene. Complete deprotection was determined by $^1$H NMR analysis (loss of tert-butoxy signal). Base polymer MW (GPC) before deprotection: $M_n$=8000; $M_w$=10000; $M_w/M_n$=1.27.

EXAMPLE 10

Deprotection of Tert-Butoxy Group from Telechelic Hydroxy Functionalized Polybutadiene with Amberlyst® in Refluxing Cyclohexane A telechelic hydroxy functionalized polybutadiene polymer with a tert-butoxy protecting group at one functional end thereof (1.5 g, 3.448×10$^{-4}$ mole) and Amberlyst® 15 ion exchange resin (1.5 g, ground powder, Aldrich) were combined in cyclohexane (10 ml). The mixture was heated to reflux for 12 hours and monitored by thin layer chromatography (TLC). The product solution was filtered to remove the Amberlyst® 15 resin. The polymer was precipitated in methanol. The solvent was evaporated under reduced pressure to give di-hydroxy-terminated polybutadiene. Complete deprotection was determined by $^1$H NMR analysis (loss of tert-butoxy signal). Base polymer MW (GPC) before deprotection: $M_n$=4350; $M_w$=4700; $M_w/M_n$=1.09.

EXAMPLE 11

Selective Deprotection of Protected Telechelic Polybutadiene with Amberlyst® 15 and Heat A telechelic dihydroxy polybutadiene polymer having a tert-butoxy protecting group and a tert-butyl dimethylsilyl protecting group (0.5 g) and Amberlyst® 15 ion exchange resin (0.025 g, Aldrich) were heated under nitrogen at 150° C. for 40 min. A Hi-Res Thermogravimetric Analyzer 2950 and Thermal Analyst 2000 (TA Instruments) were used to monitor the weight loss resulting from the elimination of isobutylene from the base polymer. Deprotection of the tert-butoxy group was determined by $^1$H NMR analysis (loss of the tert-butoxy signal) of the resulting polymer residue. The tert-butyl dimethylsilyl protecting group remained intact on the polymer.

EXAMPLE 12

Selective Deprotection of Polybutadiene Polymer Mixture with Aqueous Acid in Refluxing Tetrahydrofuran A 1:1 mixture of tert-butoxy protected polybutadiene (0.001 mole) and tert-butyldimethylsilyloxy protected polybutadiene (0.001 mole) was prepared by physical mixing using a mechanical stirrer. The mixture was dissolved in tetrahydrofuran (10 ml). Aqueous hydrochloric acid (1 ml, 0.5 N, 2.5 equivalents) was added. The solution was heated to reflux for 12 hours. The polymer was precipitated in methanol. The solvent was evaporated under reduced pressure. $^1$H NMR analysis of the residue indicated deprotection of the tert-butyldimethylsilyloxy group while the tert-butoxy group remained intact on the polymer. Tert-butoxy base polymer MW before deprotection: $M_n$=4200; $M_w$=4600; $M_w/M_n$=1.08. Tert-butyldimethylsilyloxy base polymer MW before deprotection: $M_n$=3350; $M_w/M_n$=1.08.

EXAMPLE 13

Complete Deprotection of Polybutadiene Polymer Mixture with Amberlyst® 15 in Refluxing Tert-Butylbenzene A 1:1 mixture (3 g) of tert-butoxy protected polybutadiene and tert-butyldimethylsilyloxy protected polybutadiene was prepared by physical mixing using a mechanical stirrer. The mixture was placed in tert-butylbenzene (30 ml) and Amberlyst® 15 ion exchange resin (3 g, ground powder, Aldrich) was added. The mixture was heated to reflux for 15 hours and monitored by thin layer chromatography (TLC). The product solution was filtered to remove the Amberlyst® 15 resin. The polymer was precipitated in methanol. The solvent was evaporated under reduced pressure. $^1$H NMR analysis of the residue indicated complete deprotection of both the tert-butyldimethylsilyloxy group and the tert-butoxy group. Tert-butoxy base polymer MW before deprotection: $M_n$=4200; $M_w$=4600; $M_w/M_n$=1.08. Tert-butyldimethylsilyloxy base polymer MW before deprotection: $M_n$=3350; $M_w/M_n$=1.08.

EXAMPLE 14

Deprotection of Tert-Butoxy Group from 4-Arm Star Polybutadiene Polymer with Amberlyst® 15 in Refluxing Cyclohexane A polybutadiene star polymer with a tert-butoxy protecting group (3 g) and Amberlyst® 15 ion exchange resin (0.5 g, ground powder, Aldrich) were combined in cyclohexane (20 ml). The mixture was heated to reflux for 20 hours and monitored by thin layer chromatography (TLC). The product solution was filtered to remove the Amberlyst® 15 resin. The polymer was precipitated in methanol. The solvent was evaporated under reduced pressure to give hydroxy-terminated polybutadiene star polymer. Complete deprotection was determined by $^1$H NMR analysis (loss of tert-butoxy signal).

EXAMPLE 15

Deprotection of Tert-Butoxy Group from Polymethylmethacrylate (PMMA) Star with Trimethylsilyl Iodide A polymethylmethacrylate (PMMA) star polymer with a tert-butoxy protecting group (0.5 g) was placed in chloroform (25 ml, distilled). Trimethylsilyl iodide (0.45 ml, three-fold molar excess relative to tert-butoxy protecting groups) was added. The reaction was stirred at room temperature for 1 hour. The solution was extracted with aqueous sodium bicarbonate solution three times to remove excess tert-butyl iodide. The polymer was precipitated in methanol and then washed with excess methanol. The solvent was evaporated under reduced pressure to give hydroxy-terminated polymethylmethacrylate star polymer. Complete deprotection was determined by $^1$H NMR analysis (loss of tert-butoxy signal).

EXAMPLE 16

Deprotection of Tert-Butoxy Group from Polymethylmethacrylate (PMMA) Star with Amberlyst® 15 in Refluxing Tert-Butylbenzene A PMMA star with a tert-butoxy protecting group (0.3 g) was placed in tert-butylbenzene (10 ml). Amberlyst® 15 ion exchange resin (0.3 g, ground powder, Aldrich) was added to the solution. The mixture was heated to reflux (170° C.) for 1 hour. The product solution was filtered to remove the Amberlyst® 15 resin. The product filtrate was successively washed with THF. The solvent was evaporated under reduced pressure to give hydroxy-terminated polymethylmethacrylate star polymer. Complete deprotection was determined by $^1$H NMR analysis (loss of tert-butoxy signal).

EXAMPLE 17

Deprotection of Tert-Butoxy Group from Polylutadiene with Trimethylsilyl Iodide

A polybutadiene polymer with a tert-butoxy protecting group (1.5 g) is placed in carbon tetrachloride (15 ml). Trimethylsilyl iodide (0.1 ml) is added. The reaction is stirred at room temperature and monitored by thin layer chromatography (TLC) until complete. Methanol (1 ml) and aqueous HCl (1 ml, 0.5 N solution) are added to destroy excess trimethylsilyl iodide and hydrolyze the intermediate trimethylsilyl ethers formed during the reaction. The volatiles are removed on the rotary evaporator and the residue is taken up in diethyl ether. The ether solution is washed with aqueous sodium bisulfite, aqueous sodium bicarbonate, and brine. The solvent is evaporated under reduced pressure to give hydroxy-terminated polybutadiene. The extent of deprotection is determined by $^1$H NMR analysis (loss of tert-butoxy signal).

EXAMPLE 18

Deprotection of Tert-Butoxy Group from Polybutadiene with Aqueous Acid in Refluxing Toluene/Dioxane A polybutadiene polymer with a tert-butoxy protecting group (1.5 g) is placed in aqueous hydrochloric acid (1 ml, 0.5 N), toluene (10 ml), and dioxane (10 ml). The solution is heated to reflux and monitored by thin layer chromatography (TLC) until complete. The polymer is precipitated in methanol. The solvent is removed under reduced pressure. The extent of deprotection is determined by $^1$H NMR analysis (loss of tert-butoxy signal).

EXAMPLE 19

Deprotection of Protected Telechelic Polybutadiene with Aqueous Tetrabutylammonium Fluoride/Tetrahydrofuran A telechelic polybutadiene polymer with a tert-butoxy and tert-butyl dimethylsilyloxy protecting groups (1.5 g), tetrabutylammonium fluoride (0.5 g), and water (10 ml) are combined in tetrahydrofuran (15 ml). The mixture is stirred at ambient temperature and monitored by thin layer chromatography (TLC) until complete. The polymer is precipitated in methanol. The solvent is removed under reduced pressure. The extent of deprotection (loss of tert-butyl dimethylsilyloxy signal) is determined by $^1$H NMR analysis.

EXAMPLE 20

Deprotection of Protected Telechelic Polybutadiene with Aqueous Acid in Refluxing Dioxane/Toluene A telechelic polybutadiene polymer with a tert-butoxy and tert-butyl dimethylsilyloxy protecting groups (1.5 g), aqueous hydrochloric acid (1 ml, 0.5 N), dioxane (10 ml), and toluene (10 ml) are heated to reflux and monitored by thin layer chromatography (TLC) until complete. The polymer is precipitated in methanol. The solvent is removed under reduced pressure. The extent of deprotection (loss of tert-butyl dimethylsilyloxy signal) is determined by $^1$H NMR analysis.

EXAMPLE 21

Deprotection of Tert-butoxy Group of Polybutadiene with 2-Toluenesulfonic Acid

Polybutadiene having a tert-butoxy protecting group (1 gram) was heated in cyclohexane (20 ml) with 0.3 grams p-toluenesulfonic acid. The reaction was allowed to continue for 1 hour under reflux conditions. After cooling to room temperature, the reaction mixture was washed with distilled water, followed by washing with brine. The organic layer was separated using a separatory funnel and dried with sodium sulfate. After filtering the sodium sulfate, the solvent was evaporated using a Rotary Evaporator and the final product was dried under high vacuum. Complete deprotection (loss of tert-butoxy signal) was determined by $^1$H NMR analysis of the resulting polymer residue. The final product is α-hydroxy polybutadiene. Base polymer MW (GPC) before deprotection: $M_n$=4400 g/mol; $M_w$=4900; $M_w/M_n$= 1.09.

EXAMPLE 22

Deprotection of Tert-butoxy Group of Polybutadiene with Ferric Chloride and Acetic Anhydride Deprotection of polybutadiene having a tert-butoxy protecting group was carried out by esterification followed by hydrolysis. Polybutadiene having a tert-butoxy protecting group (0.5 gram) in anhydrous ether (2 ml), acetic anhydride (0.58 g), and anhydrous ferric chloride (FeCl$_3$) (0.092 g) were stirred at room temperature for 15 hours. A saturated aqueous sodium bicarbonate solution (10 ml) was added, and the mixture was stirred for 3 hours. The aqueous layer was extracted twice with ether (30 ml), and the organic layer was separated using a separatory funnel, then dried with sodium sulfate. After filtering the sodium sulfate, the solvent was evaporated using a Rotary Evaporator, and the final product was dried under high vacuum. Complete deprotection (loss of tert-butoxy signal) was determined by $^1$H NMR analysis of the resulting polymer residue. The final product is α-hydroxy polybutadiene. Base polymer MW (GPC) before deprotection: $M_n$=4400 g/mol; $M_w$=4900; $M_w/M_n$= 1.09.

EXAMPLE 23

Deprotection of Tert-butoxy Group of Polybutadiene with Trifluoroacetic Acid (TFAA)

Polybutadiene having a tert-butoxy protecting group (1.0 gram) in cyclohexane (10 ml) and trifluoroacetic acid (CF$_3$COOH) (10 ml) were stirred at room temperature for 15 hours. A saturated aqueous sodium bicarbonate solution was added, and the mixture was washed with distilled water. The final product was dried under high vacuum. Partial deprotection (loss of tert-butoxy signal) was determined by $^1$H NMR analysis of the resulting polymer residue.

EXAMPLE 24

Deprotection of Tert-butoxy Group of Polybutadiene with Trimethylsilyl Iodide (TMSI)

Polybutadiene having a tert-butoxy protecting group (1.1 gram) in cyclohexane (11 ml) and trimethylsilyl iodide (0.356 g) were stirred at 50° C. for 4 hours. Methanol (2 ml) was added to the reaction mixture, and the reaction mixture was washed with sodium bisulfite, sodium bicarbonate and brine. The final product was dried under high vacuum. Partial deprotection (loss of tert-butoxy signal) was determined by $^1$H NMR analysis of the resulting polymer residue.

The foregoing examples are illustrative of the present invention and are not to be construed as limiting thereof. The invention is defined by the following claims, with equivalents of the claims to be included therein.

That which is claimed is:

1. A process for removing protecting groups from polymers, comprising treating a polymer having at least two dissimilar protecting groups, one of said protecting groups having the formula —[A(R$^1$R$^2$R$^1$)] in which A is carbon and R$^1$, R$^2$, and R$^3$ are each independently selected from the group consisting of hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms, in the presence of an acid catalyst capable of removing at least one of said dissimilar protecting groups without removing other dissimilar protecting groups, said acid catalyst comprising a compound selected from the group consisting of organic acids selected from the group consisting of para-toluenesulfonic acid, trifluoroacetic acid, acetic acid, and methanesulfonic acid, mineral acids selected from the group consisting of hydrochloric acid, phosphoric acid and sulfuric acid; heterogeneous acid systems selected from the group consisting of acid ion exchange resins and acid clays; Lewis acids selected from the group consisting of trimethylsilyl iodide, iron (III) chloride with acetic anhydride, and boron trihalides; and fluoride ion sources selected from the group consisting of tetraalkylammonium fluoride, potassium fluoride, sodium fluoride, cesium fluoride, lithium fluoride, lithium tetrafluoroborate, hydrogen fluoride, and pyridine hydrogen fluoride complex.

2. The process of claim 1, wherein said polymer is a multi-branched or star polymer of the formula

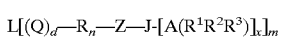

wherein:
Q is a saturated or unsaturated hydrocarbyl group derived by incorporation of a compound selected from group consisting of conjugated diene hydrocarbons, alkenyl-substituted aromatic hydrocarbons, polar compounds selected from the group consisting of esters, amides and nitriles of acrylic and methacrylic acid, and mixtures thereof;
d is an integer from 10 to 2000;
R is a saturated or unsaturated hydrocarbyl group derived by incorporation of a compound selected from the group consisting of conjugated diene hydrocarbons, alkenylsubstituted aromatic hydrocarbons, and mixtures thereof;

n is an integer from 0 to 5;

Z is a branched or straight chain hydrocarbon group which contains 3–25 carbon atoms, optionally containing aryl or substituted aryl groups;

J is oxygen, sulfur, and nitrogen; and $[A(R^1R^2R^3)]_x$ is a protecting group, in which A is an element selected from Group IVa of the Periodic Table of Elements; $R^1$, $R^2$, and $R^3$ are each independently selected from the group consisting of hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen;

L is a linking or coupling agent; and m is an integer from 3 to 50, said polymer having at least two different protecting groups $-[A(R^1R^2R^3)]_x$.

3. The process of claim 1, wherein said polymer is a polymer of Formula (I)

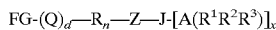

$$FG-(Q)_d-R_n-Z-J-[A(R^1R^2R^3)]_x \qquad (I)$$

wherein:

FG is a protected functional group;

Q is a saturated or unsaturated hydrocarbyl group derived by incorporation of a compound selected from group consisting of conjugated diene hydrocarbons, alkenyl-substituted aromatic hydrocarbons, polar compounds selected from the group, consisting of esters, amides and nitrites of acrylic and methacrylic acid, and mixtures thereof;

d is an integer from 10 to 2000;

R is a saturated or unsaturated hydrocarbyl group derived by incorporation of a compound selected from the group consisting of conjugated diene hydrocarbons, alkenylsubstituted aromatic hydrocarbons, and mixtures thereof;

n is an integer from 0 to 5;

Z is a branched or straight chain hydrocarbon group which contains 3–25 carbon atoms, optionally containing aryl or substituted aryl groups;

J is oxygen, sulfur, or nitrogen; and $[A(R^1R^2R^3)]_x$ is a protecting group dissimilar from FG, in which A is an element selected from Group IVa of the Periodic Table of Elements; $R^1$, $R^2$, and $R^3$ are each independently selected from the group consisting of hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen.

4. The process of claim 3, wherein the organic acid is selected from the group consisting of para-toluenesulfonic acid, trifluoroacetic acid, acetic acid, and methanesulfonic acid.

5. The process of claim 3, wherein the mineral acid is selected from the group consisting of hydrochloric acid, phosphoric acid, and sulfonic acid.

6. The process of claim 3, wherein the heterogeneous acid system is selected from the group consisting of acid ion exchange resins and acid clays.

7. The process of claim 3, wherein the Lewis Acid is selected from the group consisting of trimethylsilyl iodide, iron (III) chloride with acetic anhydride, and boron trihalides.

8. The process of claim 3, wherein the fluoride ion source is selected from the group consisting of tetraalkylammonium fluoride, potassium fluoride, sodium fluoride, cesium fluoride, lithium fluoride, lithium tetrafluoroborate, hydrogen fluoride, and pyridine hydrogen fluoride complex.

9. The process of claim 3, wherein said treating step is conducted at a temperature between about 20° C. and about 200° C.

10. The process of claim 3, wherein said treating step comprises treating a mixture of the polymer and a hydrocarbon solvent, polar solvent, excess acid catalyst or a mixture thereof.

11. The process of claim 10, wherein said treating step comprises heating the mixture at the reflux temperature thereof.

12. The process of claim 3, wherein:

the polymer of Formula (I) comprises at least one tertiary-butyldimethylsilyl protecting group and at least one tertiary alkyl protecting group; and said treating step comprises treating the polymer of Formula (I) in the presence of acid catalyst under conditions to selectively remove one of said tertiary alkyl protecting group and said tertiary-butyldimethylsilyl protecting group without removing the other.

13. The process of claim 12, wherein said treating step comprises heating the polymer in the presence of a heterogeneous acid system to selectively remove the tertiary alkyl protecting group without removing the tertiary-butyldimethylsilyl protecting groups.

14. The process of claim 12, wherein said treating step comprises heating the polymer in the presence of para-toluenesulfonic acid to selectively remove the tertiary alkyl protecting group without removing the tertiary-butyldimethylsilyl protecting group.

15. The process of claim 12, wherein said treating step comprises heating the polymer in the presence of hydrochloric acid to selectively remove the tertiary-butyldimethylsilyl protecting group without removing the tertiary alkyl protecting group.

16. The process of claim 1, wherein said polymer is a multi-branched or star polymer produced by polymerizing a monomer selected from the group consisting of conjugated diene hydrocarbons, alkenylsubstituted aromatic hydrocarbons, and polar monomers selected from the group consisting of esters, amides and nitrites of acrylic and methacrylic acid, singly, sequentially or as a mixture thereof, with a protected functional organometallic initiator of the formula

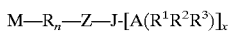

$$M-R_n-Z-J-[A(R^1R^2R^3)]_x \qquad (III)$$

wherein:

M is an alkali metal;

R is a saturated or unsaturated hydrocarbyl group derived by incorporation of a compound selected from the group consisting of conjugated diene hydrocarbons, alkenylsubstituted aromatic hydrocarbons, and mixtures thereof;

n is an integer from 0 to 5;

Z is a branched or straight chain hydrocarbon group which contains 3–25 carbon atoms, optionally containing aryl or substituted aryl groups;

J is oxygen, sulfur, or nitrogen;

$[A(R^1R^2R^3)]_x$ is a protecting group, in which A is an element selected from Group IVa of the Periodic Table of Elements;

$R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen, to form a mono-protected, mono-functionalized living polymer; and coupling said living polymer with at least one other living polymer with a linking agent to provide a multi-branched or star polymer, said polymer having at least two different protecting groups —$[A(R^1R^2R^3)]_x$.

17. The process of claim 16, wherein the organic acid is selected from the group consisting of para-toluenesulfonic acid, trifluoroacetic acid, acetic acid, and methanesulfonic acid.

18. The process of claim 16, wherein the mineral acid is selected from the group consisting of hydrochloric acid, phosphoric acid and sulfonic acid.

19. The process of claim 16, wherein the heterogeneous acid system is selected from the group consisting of acid ion exchange resins and acid clays.

20. The process of claim 16, wherein the Lewis Acid is selected from the group consisting of trimethylsilyl iodide, iron (III) chloride with acetic anhydride, and boron trihalides.

21. The process of claim 16, wherein the fluoride ion source is selected from the group consisting of tetraalkylammonium fluoride, potassium fluoride, sodium fluoride, cesium fluoride, lithium fluoride, lithium tetrafluoroborate, hydrogen fluoride, and pyridine hydrogen fluoride complex.

22. The process of claim 16, wherein said treating step is conducted at a temperature between about 20° C. and about 200° C.

23. The process of claim 16, wherein said treating step comprises treating a mixture of the polymer and a hydrocarbon solvent, polar solvent, excess acid catalyst, or a mixture thereof.

24. The process of claim 16, wherein said treating step comprises heating the mixture at the reflux temperature thereof.

25. The process of claim 16, wherein:

the polymer includes different protecting groups prepared by polymerizing a monomer selected from the group consisting of conjugated diene hydrocarbons, alkenyl-substituted aromatic hydrocarbons, and polar monomers, singly, sequentially or as a mixture thereof, with protected functional organolithium initiators of Formula (III) in which $[A(R^1R^2R^3)]_x$ is different.

* * * * *

UNITED STATES PATENT AND TRADEMARK OFFICE
CERTIFICATE OF CORRECTION

PATENT NO. : 6,184,309 B1
DATED : February 6, 2001
INVENTOR(S) : Schwindeman et al.

It is certified that error appears in the above-identified patent and that said Letters Patent is hereby corrected as shown below:

Column 26,
Line 28, "$(R^1R^2R^1)$" should read -- $(R^1R^2R^3)$ --;
Line 63, "nitrites" should read -- nitriles --.

Column 27,
Line 38, "nitrites" should read -- nitriles --.

Column 28,
Line 54, "nitrites" should read -- nitriles --.

Signed and Sealed this

Sixteenth Day of October, 2001

Attest:

NICHOLAS P. GODICI
*Attesting Officer*  *Acting Director of the United States Patent and Trademark Office*